United States Patent [19]
Ohnishi

[11] Patent Number: 5,350,958
[45] Date of Patent: Sep. 27, 1994

[54] SUPERCONDUCTING ROTATING MACHINE, A SUPERCONDUCTING COIL, AND A SUPERCONDUCTING GENERATOR FOR USE IN A LIGHTING EQUIPMENT USING SOLAR ENERGY

[76] Inventor: Yoshihiro Ohnishi, 710, 432-103, Tesada-machi, Hachiohji City, Tokyo, Japan

[21] Appl. No.: 975,445

[22] Filed: Jan. 17, 1992

[30] Foreign Application Priority Data

Jan. 17, 1991 [JP] Japan .................................. 3-072630
Jan. 17, 1991 [JP] Japan .................................. 3-142324

[51] Int. Cl.$^5$ ............................................ H02K 9/00
[52] U.S. Cl. .................................... 310/52; 310/10; 310/90; 310/154; 310/156; 310/179; 310/181; 310/208; 505/876; 505/877; 505/878
[58] Field of Search ............... 310/10, 179, 40 R, 180, 310/52, 181, 184, 156, 154, 89, 90, 208; 290/2; 136/243; 505/704, 878, 740, 813, 821, 876, 923, 877

[56] References Cited

U.S. PATENT DOCUMENTS 2,942,411  6/1960  Hutchings ................... 290/2 UX
3,534,459  10/1970  Kudo .......................... 505/813
4,564,564  1/1986  Schuller ...................... 505/813
4,908,347  3/1990  Denk ............................ 505/1

FOREIGN PATENT DOCUMENTS

4-62721  2/1992  Japan ........................... 505/813
4-65032  3/1992  Japan ........................... 505/813

Primary Examiner—R. Skudy
Attorney, Agent, or Firm—Wenderoth, Lind & Ponack

[57] ABSTRACT

A superconducting rotating machine comprises a cylindrical frame, a stator installed integrally around an inner periphery of the cylindrical frame and a rotor arranged concentrically and rotatably within the stator in a juxtaposed spaced relationship to the inner surfaces of the stator and with a cylindrical clearance between the inner periphery of the stator and the outer periphery of the rotor. The stator coil includes a primary coil having extra fine Cu filaments and a secondary coil having extra fine filaments made of a superconducting alloy containing Cu, Nb$_3$Sn, V$_3$Ga, V$_3$Ge, Bi, Ca, CuO and Sr. The secondary coil is covered with an insulating layer. Even if a conventional rotatable cryogenic container is not provided, a strong anomalous pseudo-Josephson effect can be obtained. A superconducting generator for use in lighting equipment is also disclosed.

5 Claims, 8 Drawing Sheets

SUPERCONDUCTING ROTATING MACHINE, A SUPERCONDUCTING COIL, AND A SUPERCONDUCTING GENERATOR FOR USE IN A LIGHTING EQUIPMENT USING SOLAR ENERGY

BACKGROUND OF THE INVENTION

1. Field of Invention

This invention relates to a superconducting rotating machine, a superconducting coil and a superconducting generator for use in lighting equipment using solar energy, whereby an anomalous pseudo-Josephson effect can be obtained not only by the superconducting coil, but also when energized by exerting a driving torque on the rotor through homopolar repulsion of permanent magnets without using the conventional rotatable cryogenic container for maintaining the superconductive state, and continuous rotary motion can be obtained in order to improve the generating efficiency almost without consuming electrical power from a storage battery.

2. Brief Description of A Super-Conducting Rotating Machine

A superconducting rotating machine of this invention is a device which comprises a cylindrical frame, a cylindrical permanent magnet stator, a stator coil including a primary coil having extra fine Cu filaments and a secondary coil containing fine filaments made of superconducting alloy containing Cu, $Nb_3Sn$, $V_3Ga$, $V_3Ge$, Bi, Ca, CuO and Sr and a rotor arranged within the stator.

For power stations, finite natural resources such as oil, coal and nuclear fuel are used today, but they produce harmful by-products and cause environmental pollution.

DESCRIPTION OF PRIOR ARTS

It has been proposed to use a device using a solar array for converting infinite and pollution-free solar energy into electrical energy which is charged into a storage battery for driving a superconducting rotating machine.

According to the conventional superconducting rotating machine, it has been necessary to provide a rotatable cryogenic container to maintain the superconductive state. A rotatable cryogenic container using nitrogen gas or helium gas should thus be provided.

The rotatable cryogenic container, however, necessarily increases the size, has operational difficulty, and the generated output is very small.

The homopoles of a permanent magnet repel each other, and the heteropoles thereof attract each other, so that even if the negative pole is cut into a very thin piece, and the positive pole is cut into a very thin piece, respectively, one of them is magnetized the negative pole and another is magnetized the positive pole, respectively, thus making it difficult to obtain rotary motion.

SUMMARY OF INVENTION

A primary object of this invention is to provide a novel superconducting rotating machine which comprises a cylindrical frame, a cylindrical permanent magnet stator, a stator coil including a primary coil and a secondary superconducting coil and a rotor arranged within the superconducting coil, whereby an anomalous pseudo-Josephson effect can be obtained, not only by the superconducting coil, but also when energized, by exerting a driving torque on the rotor through homopolar repulsion of permanent magnets.

Another object of this invention is to provide a novel superconducting stator coil for a superconducting rotating machine whereby an excellent anomalous pseudo-Josephson effect can he obtained at a low cost.

Another object of this invention is to provide a novel permanent magnet stator for a superconducting rotating machine whereby continuous rotary motion can be maintained.

A further object of this invention is to provide a novel rotor for a superconducting rotating machine whereby the superconductive state can be maintained.

Still another object of this invention is to provide a superconducting generator for use in lighting equipment in order to improve the generating efficiency almost without consuming electrical power from a storage battery.

BRIEF DESCRIPTION OF THE DRAWINGS

Other objects and advantages of this invention may be realized when the specification is considered in connection with the accompanying drawings in which.

DESCRIPTION OF THE PREFERRED EMBODIMENT

Figure 1:
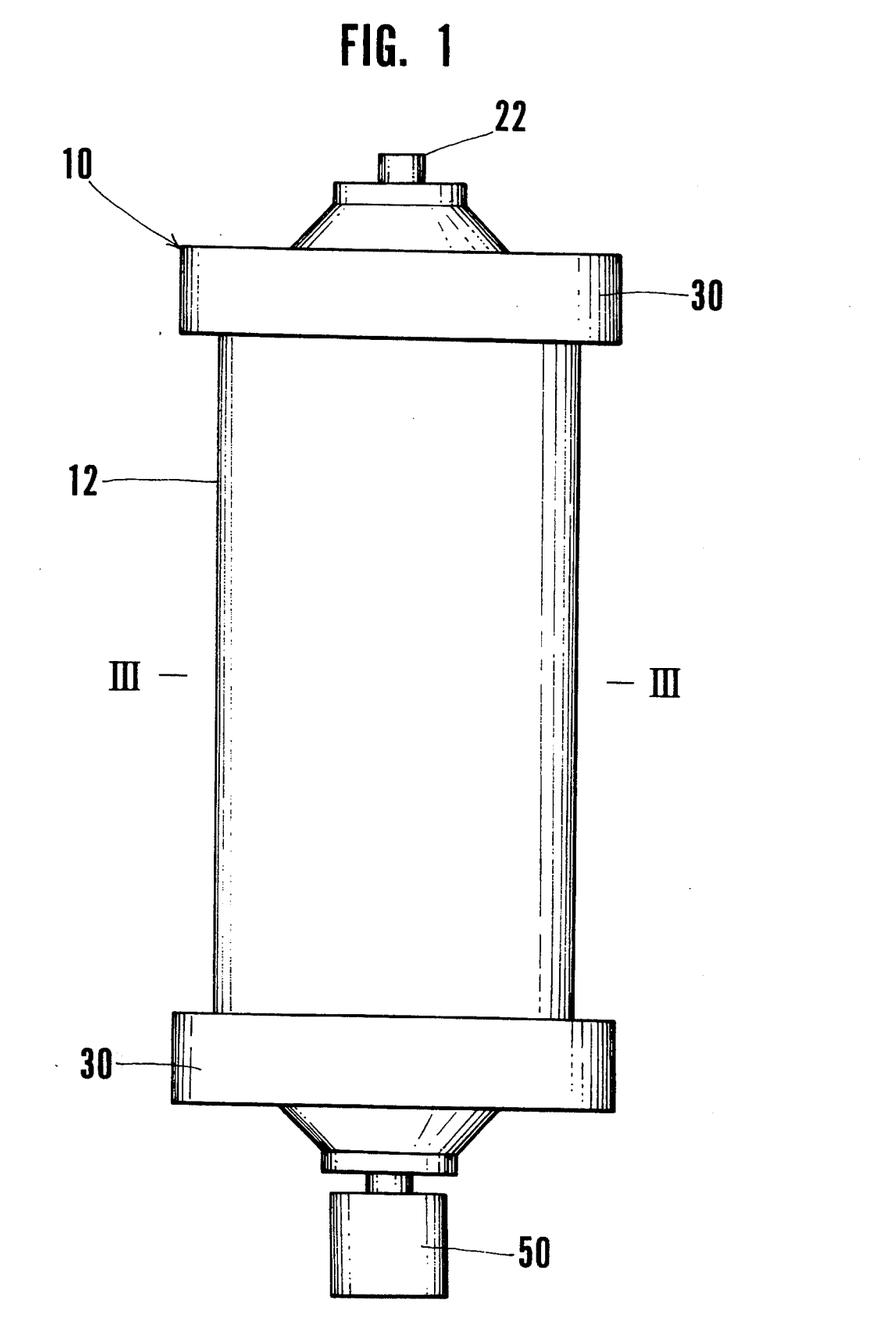
FIG. 1 is a front elevation of a superconducting rotating machine of this invention.
Figure 2:
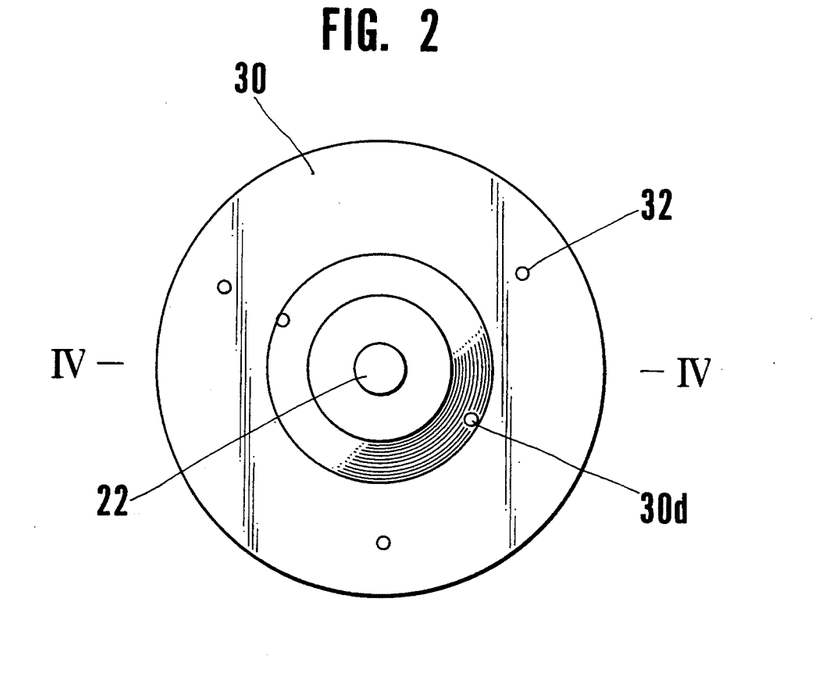
FIG. 2 is a plan view of the superconducting rotating machine shown in FIG. 1.
Figure 3:
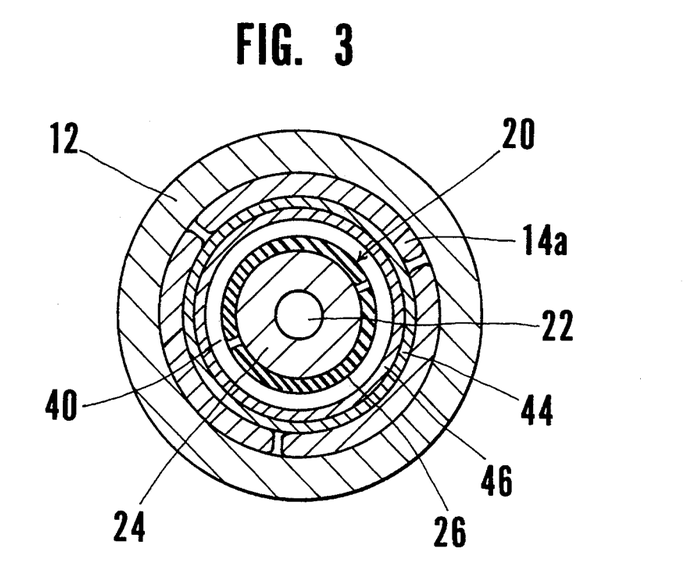
FIG. 3 is a horizontal sectional view taken along lines III—III of FIG. 1.

Referring now to the accompanying drawings, in which like reference numerals designate like parts throughout the several views thereof, there is shown in FIGS. 1, 2 and 3 a superconducting rotating machine 10 of this invention.

The superconducting rotating machine 10 comprises a cylindrical non-magnetic frame 12 and a stator 14 installed integrally around an inner surface of the cylindrical non-magnetic frame 12.

Figure 8:
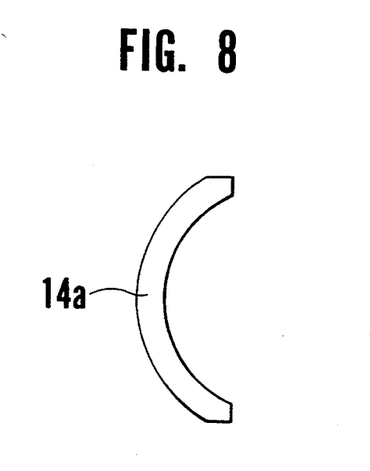
FIG. 8 is an enlarged plan view of an arcuate permanent magnet of a stator shown in FIG. 4.
Figure 9:
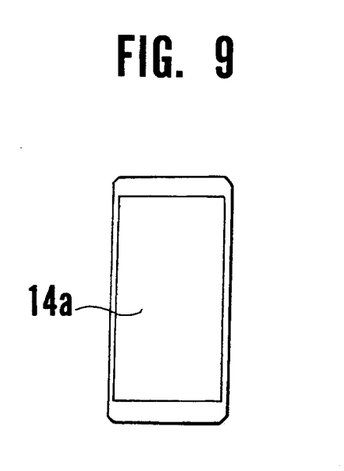
FIG. 9 is a right side elevation of the arcuate shaped permanent magnet shown in FIG. 8.

Each ring of the stator 14 includes three arcuate shaped permanent magnets 14a, 14a, and 14a, which are particularly shown in FIGS. 8 and 9. A plurality of the rings are longitudinally stacked on the inner surface of the cylindrical nonmagnetic frame 12. The arcuate shaped permanent magnets 14a have an outer surface with a radius approximately equal to the radius of the inner surface of the cylindrical frame 12.

A stator coil 42 is integrally installed around an inner surface of the cylindrical non-magnetic frame 12. The stator coil 42 comprises a primary coil 44 having extra fine Cu filaments, and a secondary coil 46 which includes extra fine filaments made of superconducting alloy containing Cu, $Nb_3Sn$, $V_3Ga$, $V_3Ge$, Bi, Ca, CuO and Sr.

The secondary coil 46 is integrally covered with a Cu layer, which in turn is covered with an insulating layer.

A rotor 20 comprises a non-magnetic shaft 22 having a given diameter and length, a cylindrical non-magnetic holder 24 integrally provided around the outer periphery of the non-magnetic shaft 22, a permanent magnet cylinder 26 provided around the non-magnetic holder 24 and an end disk 26b provided at end portions of the rotor 20.

Figure 10:
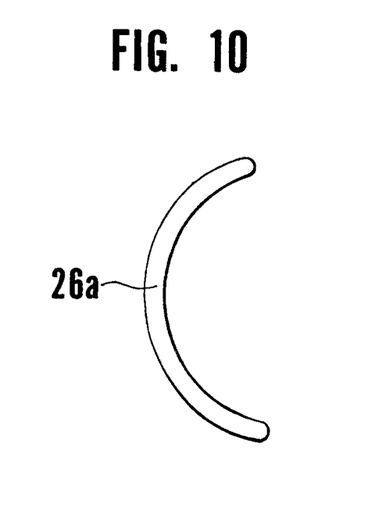
FIG. 10 is an enlarged plan view of an arcuate shaped permanent magnet of a rotor shown in FIG, 4.
Figure 11:
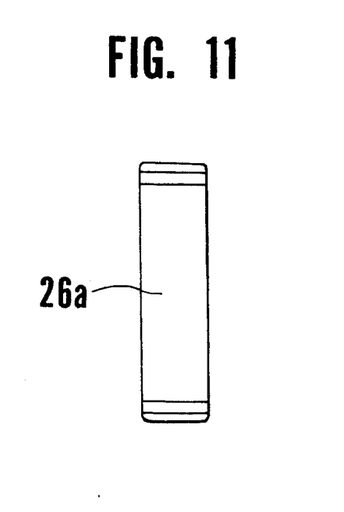
FIG. 11 is a right side elevation of the arcuate shaped permanent magnet shown in FIG. 10.

The permanent magnet cylinder 26 is composed of a plurality of permanent magnet rings, each ring including a pair of arcuate shaped or semi-cylindrical permanent magnets 26a and 26a as shown in FIGS. 10 and 11.

A diameter of an outer circumference of the rotor 20, which is rotatably arranged within the stator 14, is less than that of the stator 14.

The rotatable non-magnetic shaft 22 of the rotor 20 has a given diameter and length so that the rotor 20 may be rotatably arranged within the stator 14, and one end of the shaft 22 is elongated to allow an integral provision of an auxiliary motor 50 thereto.

The rotor 20 is concentrically and rotatably arranged within the stator 14 in a juxtaposed spaced relationship to the inner surface of the secondary coil 46 and with a cylindrical clearance 40 between the inner periphery of the stator 14 and the outer periphery of the rotor 20.

Figure 7:
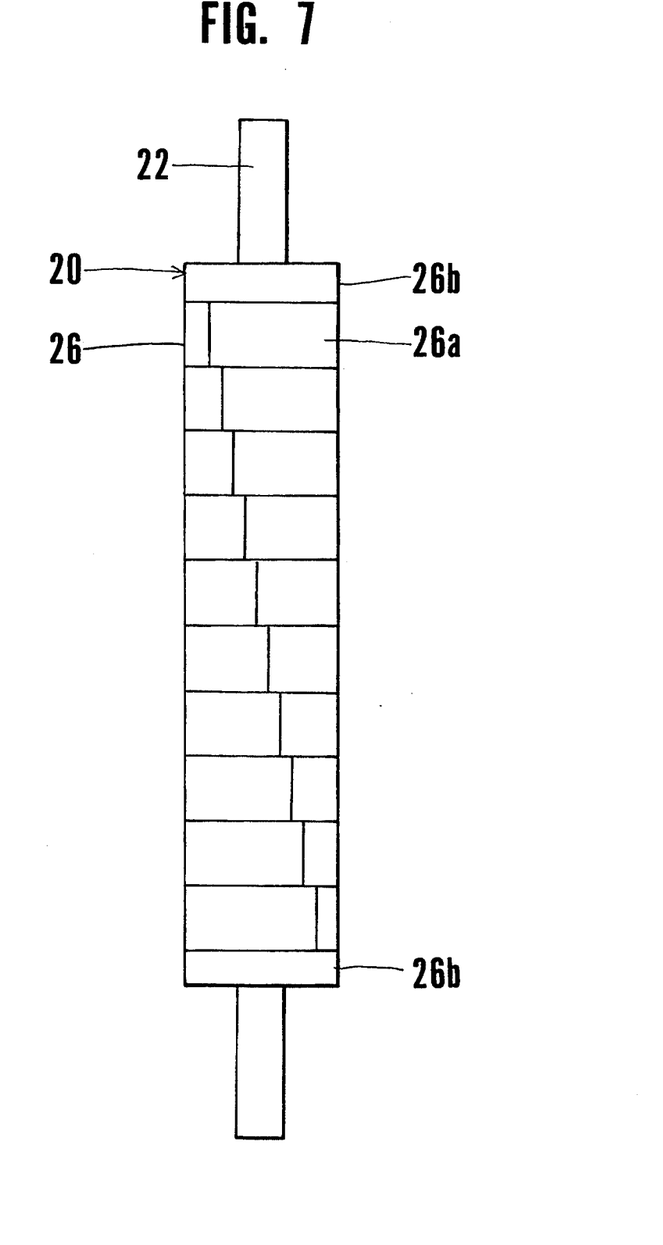
FIG. 7 is a front elevation of a rotor arranged rotatably within the stator shown in FIG. 4.

As shown in FIG. 7, the rings of the permanent magnet cylinder 26, each ring consisting of a pair of the arcuate shaped or semicylindrical permanent magnets 26a, are provided concentrically, radially with reference to the arcuate permanent magnets 14a, and with a radial delay of an angle between 15 and 30 degrees in a longitudinal direction.

Accordingly, when the inner periphery of each arcuate permanent magnet 14a is magnetized the negative pole, the inner periphery of the semicylindrical permanent magnet 26a is magnetized the negative pole as well.

On the other hand, when the inner periphery of the arcuate permanent magnet is magnetized the positive pole, the inner periphery of the semicylindrical permanent magnet 26a is magnetized the positive pole too.

To this end, a driving torque is exerted on the rotor 20 through the homopolar repulsive force of the permanent magnets 14a and 26a to produce continuously rotary motion.

Near both end portions of the rotatable shaft 22 are fitted a pair of bearings 28, which are respectively received into a pair of cylindrical cavities 30a formed at each central inner portion of a respective non-magnetic disk end cover 30. The rotatable shaft 22 penetrates through respective central openings 30b of the disk end covers 30.

A plurality of small openings 30c are provided at regular intervals near a peripheral portion of the non-magnetic disk end cover 30. A plurality of small openings 24a are provided at the mating positions of an end cover 224, and a plurality of small cavities 12a are provided at mating positions of an end portion of the non-magnetic frame 12. A pair of small openings 30d are provided near the central opening 30b, allowing penetration of a pair of leads 44a and 46a of the primary coil 44 and the secondary coil 46, respectively.

A screw bolt 32 is screwed into the small openings 30c to provide the disk end cover 30 on the end portion of the cylindrical non-magnetic frame 12 so that the superconducting rotating machine 10 may be constructed.

Figure 4:
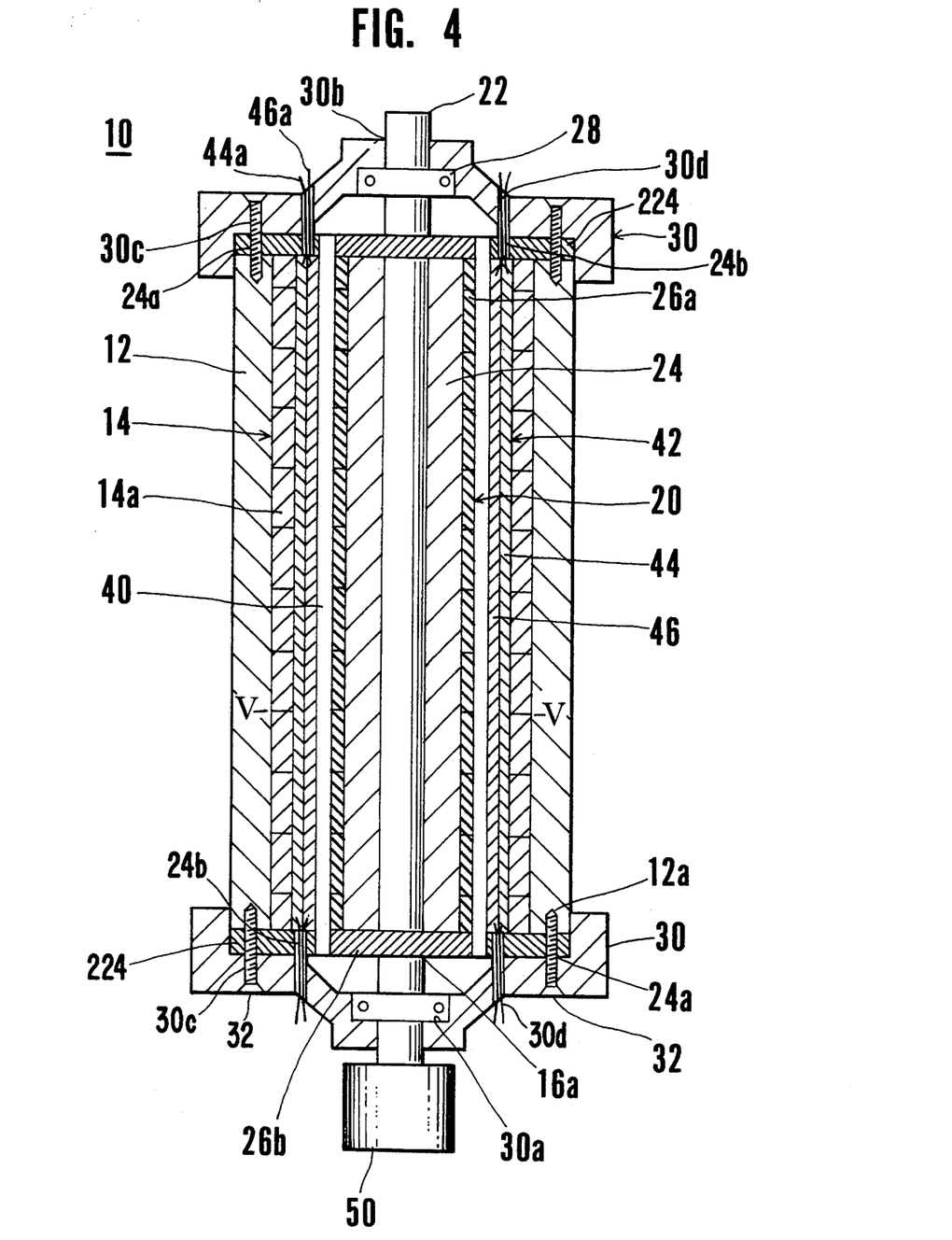
FIG. 4 is a vertical sectional view taken along the lines IV—IV of FIG. 2.
Figure 5:
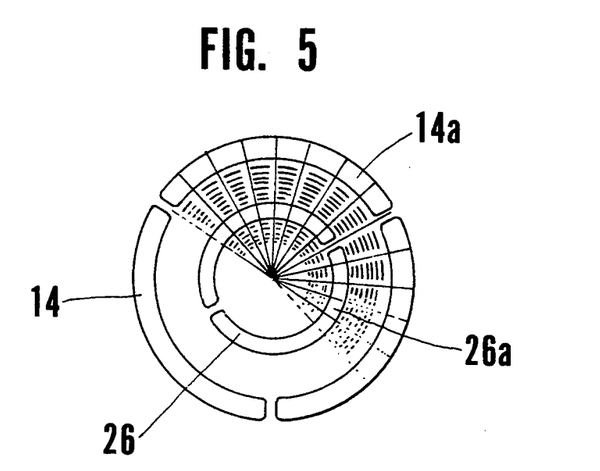
FIG. 5 is a schematic horizontal sectional view taken along the lines V—V of FIG. 4.

As shown in FIGS. 1 and 4, the auxiliary motor 50 is integrally provided at an elongated portion of the rotatable shaft 22.

In FIG. 4, the stator coil 42 includes a pair of the primary Cu coil 44 wound up in spiral forms and the secondary superconducting coil 46 wound up in spiral forms around the inner surface of the primary Cu coils 44.

As described in the foregoing paragraphs, the lead 44a of the primary coil 44 and the lead 46a of the secondary superconducting coil 46 are penetrated through small openings 24b of the end disk 24 and the small openings 30d and these leads 44a and 46a are connected to a storage battery, such as a lead battery 106, which will be explained in detail later.

As mentioned in the foregoing paragraphs, the primary Cu coil 44 includes a number of extra fine multiconducting filaments wound up in spiral forms, and the secondary coil 46 includes a number of extra fine multiconducting filaments wound up in spiral forms. Each of the superconducting filaments is made of superconducting alloy containing Cu, $Nb_3Sn$, $V_3Ga$, $V_3Ge$, Bi, Ca, CuO and Sr.

Figure 6:
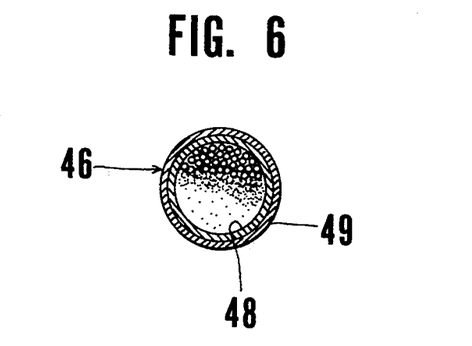
FIG. 6 is a greatly enlarged schematic horizontal sectional view of a superconducting coil wound around an inner surface of a primary coil shown in FIG. 4.

The secondary superconducting coil 46 is integrally covered with a Cu layer 48, which in turn is covered with an insulating layer 49 (see FIG. 6).

Figure 12:
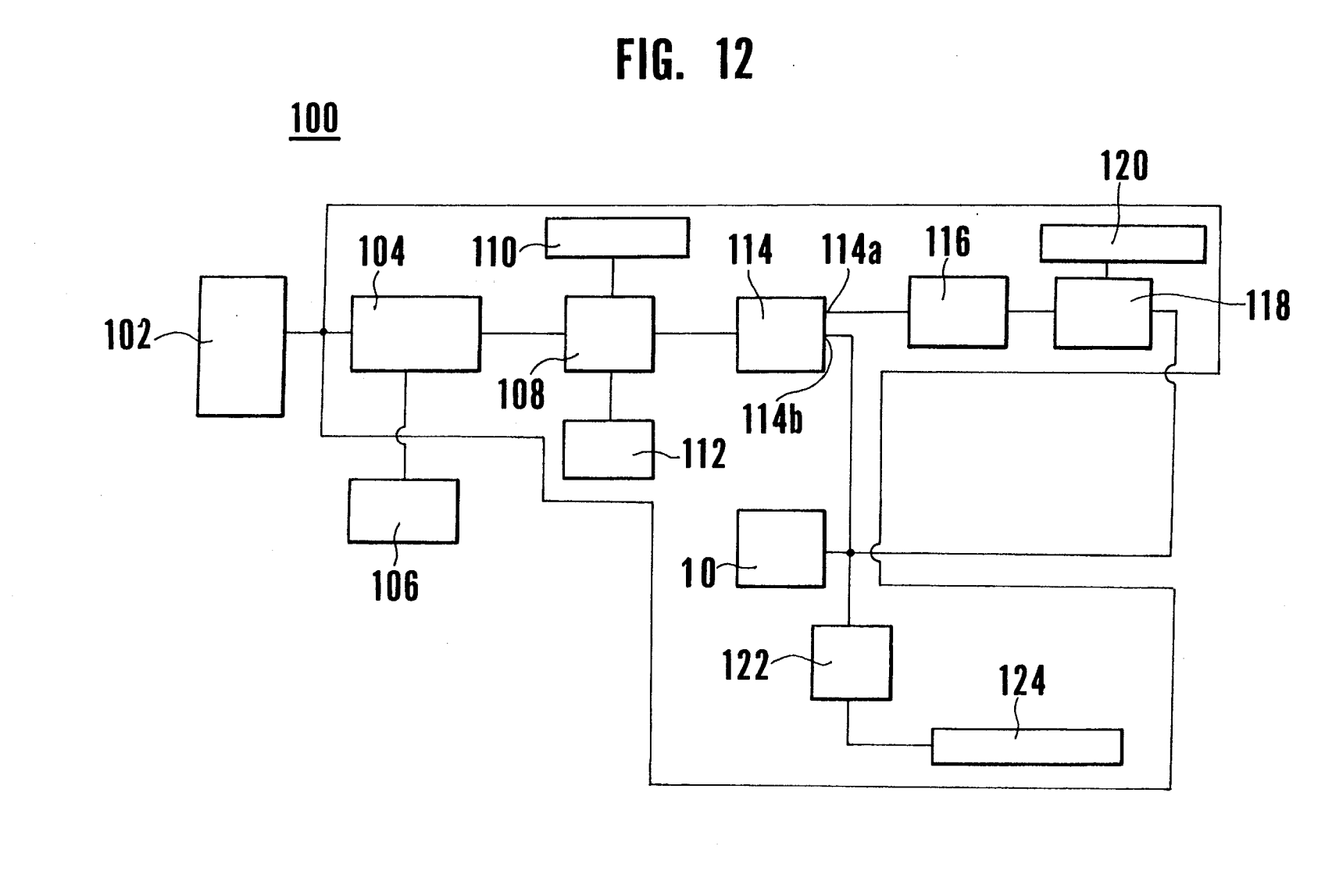
FIG. 12 is a circuit diagram of a superconducting generator for use in lighting equipment using solar energy.

As shown in FIG. 12, a solar array 102 is connected to an anti-overcharge circuit 104 which is connected to a storage battery, such as a lead battery, 106.

To the anti-overcharge circuit 104 is connected an anti-overdischarge circuit 108 having an over-discharge meter 110 and an anti-chattering circuit 112.

To the anti-overdischarge circuit 108 is connected a control unit 114 having an external tumbler switch 114a and an automatic-manual transfer switch 114b.

A sunset illuminance detecting circuit 120 is connected to the control unit 114 through a timer 118.

In addition, the timer 118 is connected to the external tumbler switch 114. A D/A inverter 122 having a lighting equipment such as a fluorescent lamp 124 is connected to the control unit 114, and also to the anti-overcharge circuit 104. The superconducting rotating machine 10 is connected to a middle point between the control unit 114 and the D/A inverter 122.

Figure 13:
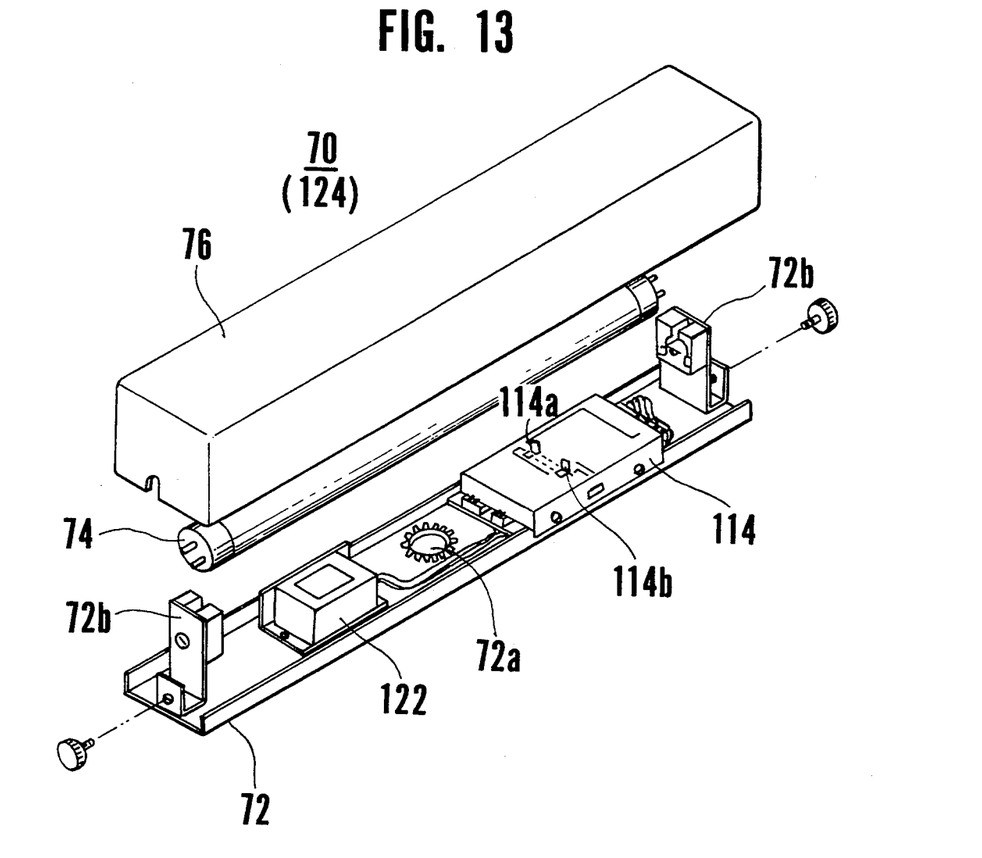
FIG. 13 is a schematic perspective view of lighting equipment.

FIG. 13 illustrates lighting equipment such as the fluorescent lamp 124 discussed above. The lighting and equipment is referenced as number 70 in this figure. Reference number 72 indicates a base for the lighting equipment. In the base is provided a hole 72a providing communication through the base, and on the ends of the base 72 are provided mounts 72b. These mounts 72b are used to mount a fluorescent lamp 74. Cover 76 is provided for covering the fluorescent lamp 74. As can be seen from the figure, the D/A inverter 122, the control unit 114 and the external tumbler switch 114a and automatic-manual transfer switch 114b can also be provided on the base 72.

Figure 14:
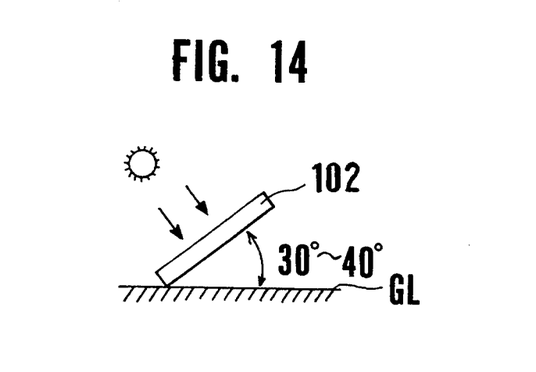
FIG. 14 is a schematic representation of a solar array to be used in the superconducting generator of this invention.

As shown in FIG. 14, the solar array 102 is arranged on a desired place with a given angle to the sun.

In accordance with the example of this invention, solar thermal energy is converted into electrical energy by the solar array 102, and the electric current from the solar array 102 is charged through the anti-overcharge circuit 104 into the lead battery 106.

The electric current from the lead battery 106 is supplied to the superconducting rotating machine 10 and the auxiliary motor 50 through the anti-overcharge circuit 104 and other circuits.

When the electric current is supplied to the primary coil 44, the secondary coil 46 made of the superconducting alloy and the auxiliary motor 50, the continuously rotary motion, which is at a right angle to the magnetic flux and the direction of the electric current, is brought about to rotate the rotor 20.

It is so designed that the arcuate permanent magnets 14a of the cylindrical permanent magnet stator 14 are arranged concentrically and radially to the arcuate shaped permanent magnets 26a of the stator 14.

More particularly, the shaped arcuate permanent magnets 26a are arranged circumferentially and longitudinally to the arcuate permanent magnets 14a with a radial delay of an angle between 15–30 degrees.

Accordingly, when the inner periphery of the arcuate permanent magnets 14a is magnetized as the negative pole, the inner periphery of the arcuate permanent magnets 26a is magnetized as the negative pole too. At the same time, when the outer periphery of the arcuate permanent magnet 26a is magnetized as the positive pole, the inner periphery of the arcuate shaped permanent magnet 14a is magnetized the positive pole too, thus exerting the driving torque on the rotor 20 by homopolar repulsive force of the arcuate shaped permanent magnets 14a and 26a.

In accordance with this invention, there is no need to provide the conventional rotatable cryogenic system to maintain the superconductive state and also to obtain an excellent pseudo-Josephson effect.

In order to start driving the auxiliary motor 50, the electric current is first supplied thereto from the lead battery 106, but once the continuously rotary motion can be obtained to improve generating efficiency almost without consuming electric current from the lead battery 106.

There will now be obvious to those skilled in the art many modifications and variations of the above described structure. These modifications and variations will not depart from the scope of the invention as defined by the following claims.

What I claim is:

1. A superconducting rotating apparatus, comprising:
   a cylindrical frame having an inner peripheral surface;
   a cylindrical stator disposed in said cylindrical frame around said inner peripheral surface thereof, said cylindrical stator comprising a plurality of permanent magnet rings, wherein each said permanent magnet ring comprises three arcuate permanent magnets that have outer arcuate surfaces with a radius approximately equal to a radius of said inner peripheral surface of said cylindrical frame, and wherein said three arcuate permanent magnets have said outer arcuate surfaces thereof engaging said inner peripheral surface of said cylindrical frame, and a pair of end covers at opposite ends of said cylindrical stator;
   said cylindrical stator having an inner surface;
   a stator coil disposed around said inner surface of said cylindrical stator, said stator coil comprising a primary coil and a secondary coil, said primary coil comprising extra fine Cu filaments and said secondary coil comprising extra fine filaments of superconducting alloy containing Cu, $Nb_3Sn$, $V_3Ga$, $V_3Ge$, Bi, Ca, CuO, and Sr, said secondary coil being covered with a Cu layer, and said Cu layer being covered with an insulating layer;
   a rotor disposed concentrically and rotatably inside said cylindrical stator, said rotor having a cylindrical clearance around an outer periphery thereof spacing said rotor from said stator coil, and said rotor comprising a non-magnetic shaft, a cylindrical non-magnetic holder integral with and disposed around said non-magnetic shaft, a plurality of permanent magnet rings disposed around said non-magnetic shaft, wherein each said permanent magnet ring of said rotor comprises a pair of arcuate permanent magnets, and a pair of non-magnetic end disks at opposite ends of said rotor;
   a pair of non-magnetic disk end covers on opposite ends of said cylindrical frame, each said disk end cover comprising a bearing supporting an end of said non-magnetic shaft of said rotor; and
   an auxiliary motor connected with one said end of said non-magnetic shaft of said rotor.

2. The superconducting rotating apparatus of claim 1, wherein said pairs of arcuate permanent magnets of said rotor are disposed circumferentially and axially around said cylindrical non-magnetic holder, each said arcuate permanent magnet of said rotor having a predetermined length and width with a radial delay of an angle between 15 and 30 degrees in the axial direction.

3. The superconducting rotating apparatus of claim 2, wherein said end covers and said non-magnetic disk end covers have small openings therein, and said primary and secondary coils have leads penetrating said small openings.

4. The superconducting rotating apparatus of claim 1, wherein said end covers and said non-magnetic disk end covers have small openings therein, and said primary and secondary coils have leads penetrating said small openings.

5. An apparatus, comprising:
   a superconducting rotating apparatus, comprising
      a cylindrical frame having an inner peripheral surface,
      a cylindrical stator disposed in said cylindrical frame around said inner peripheral surface thereof, said cylindrical stator comprising a plurality of permanent magnet rings, wherein each said permanent magnet ring comprises three arcuate permanent magnets that have outer arcuate surfaces with a radius approximately equal to a radius of said inner peripheral surface of said cylindrical frame, and wherein said three arcuate permanent magnets have said outer arcuate surfaces thereof engaging said inner peripheral surface of said cylindrical frame, and a pair of end covers at opposite ends of said cylindrical stator,
      said cylindrical stator having an inner surface,
      a stator coil disposed around said inner surface of said cylindrical stator, said stator coil comprising a primary coil and a secondary coil, said primary coil comprising extra fine fine Cu filaments and said secondary coil comprising extra filaments of superconducting alloy containing Cu, $Nb_3Sn$, $V_3Ga$, $V_3Ge$, Bi, Ca, CuO, and Sr, said secondary coil being covered with a Cu layer, and said Cu layer being covered with an insulating layer, a rotor disposed concentrically and rotatably inside said cylindrical stator, said rotor having a cylindrical clearance around an outer periphery thereof spacing said rotor from said stator coil, and said rotor comprising a non-magnetic shaft, a cylindrical non-magnetic holder integral with and disposed around said non-magnetic shaft, a plurality of permanent magnet rings disposed around said non-magnetic shaft, wherein each said permanent magnet ring of said rotor comprises a pair of arcuate permanent magnets, and a pair of non-magnetic end disks at opposite ends of said rotor, a pair of non-magnetic disk end covers on opposite ends of said cylindrical frame, each said disk end cover comprising a bearing supporting an end of said non-magnetic shaft of said rotor, and an auxiliary motor connected with one said end of said non-magnetic shaft of said rotor;

a solar array having a desired angular position relative to the sun;

an anti-overcharge circuit connected to said solar array;

a storage battery connected to said anti-overcharge circuit;

an anti-overdischarge circuit connected to said anti-overcharge circuit, said anti-overdischarge circuit having an anti-overdischarge meter and an anti-chattering circuit connected therewith;

a control unit connected to said anti-overdischarge circuit, said control unit having an automatic-manual transfer switch and an external tumbler switch;

a sunset illuminance detecting circuit connected to said control unit;

a timer connected to said sunset illuminance detecting circuit;

a D/A inverter connected to said control unit; and lighting equipment connected to said D/A inverter;

wherein said superconducting rotating apparatus is connected to and between said control unit and said D/A inverter.

* * * * *